(12) United States Patent
Chen et al.

(10) Patent No.: US 11,828,672 B2
(45) Date of Patent: Nov. 28, 2023

(54) DESIGNING METHOD OF TEST FLUME WITH SPECIAL-SHAPED CROSS SECTION AND APPLICATION THEREOF

(71) Applicant: INSTITUTE OF MOUNTAIN HAZARDS AND ENVIRONMENT CHINESE ACADEMY OF SCIENCES, Sichuan (CN)

(72) Inventors: Jiangang Chen, Sichuan (CN); Xian Wang, Sichuan (CN); Huayong Chen, Sichuan (CN); Xiaoqing Chen, Sichuan (CN); Jinbo Tang, Sichuan (CN); Wanyu Zhao, Sichuan (CN); Tao Wang, Sichuan (CN); Wenrun Liu, Sichuan (CN); Xinglong Gong, Sichuan (CN)

(73) Assignee: INSTITUTE OF MOUNTAIN HAZARDS AND ENVIRONMENT CHINESE ACADEMY OF SCIENCES, Sichuan (CN)

( * ) Notice: Subject to any disclaimer, the term of this patent is extended or adjusted under 35 U.S.C. 154(b) by 354 days.

(21) Appl. No.: 17/267,349

(22) PCT Filed: Dec. 27, 2019

(86) PCT No.: PCT/CN2019/129019
§ 371 (c)(1),
(2) Date: Feb. 9, 2021

(87) PCT Pub. No.: WO2020/147550
PCT Pub. Date: Jul. 23, 2020

(65) Prior Publication Data
US 2021/0293660 A1    Sep. 23, 2021

(30) Foreign Application Priority Data

Jan. 14, 2019 (CN) .......................... 201910030436.8

(51) Int. Cl.
*G01M 10/00* (2006.01)
*E02B 1/02* (2006.01)

(52) U.S. Cl.
CPC ............... *G01M 10/00* (2013.01); *E02B 1/02* (2013.01)

(58) Field of Classification Search
CPC .................................. G01M 10/00; E02B 1/02
See application file for complete search history.

(56) References Cited

U.S. PATENT DOCUMENTS

2012/0201605 A1* 8/2012 Hill ....................... E04H 4/0006
    405/79
2013/0263681 A1* 10/2013 Jeong ..................... G09B 23/12
    73/865.6

* cited by examiner

*Primary Examiner* — Paul M. West
(74) *Attorney, Agent, or Firm* — Scully, Scott, Murphy & Presser, P.C.

(57) ABSTRACT

A method for forming a test flume usable in hydraulic engineering and debris-flow hazard mitigation is provided. The test flume has a foundation flume and an expansion flume. The expansion flume has a lower edge connected to an upper edge of the foundation flume. A hydraulic radius of the test flume is determined based on a model test. A width of the foundation flume is selected based on a size of the test site of the model test. A coefficient is obtained and a width of the test flume is obtained. A cross section curve equation of the expansion flume is obtained based on the hydraulic radius of the test flume, the coefficient, the width of the test flume and the width of the foundation flume. The test flume is formed based on the cross section curve equation of the expansion flume.

3 Claims, 2 Drawing Sheets

DESIGNING METHOD OF TEST FLUME WITH SPECIAL-SHAPED CROSS SECTION AND APPLICATION THEREOF

TECHNICAL FIELD

The invention relates to a designing method for a test flume with a special cross section and a fixed hydraulic radius and its application, which is suitable for modeling test research, and is part of the field of the optimal design of hydraulic engineering and debris-flow hazard mitigation.

BACKGROUND OF THE INVENTION

A flume model test is commonly used to study the characteristics of clear water flow, hyperconcentration flow, and debris flow. The control accuracy of the flume test device and the measurement accuracy of the test instrument are two important factors that affect the accuracy of the test results. Therefore, the parameter control mode and precision of the flume model test and the equipment precision of the measuring instrument need to be improved continuously.

At present, the cross section of the flume test device is mainly rectangular. The relationship between the hydraulic radius of the cross section and the water depth (debris-flow depth) and flume width is as follows:

$$R = \frac{hb}{2h+b},$$

where R is the hydraulic radius, h is the water depth (debris-flow depth), and b is the width of the flume. Under the condition of a fixed width of the flume, the hydraulic radius changes with the water depth variation (debris-flow depth) in the flume. Therefore, the existing way to control the hydraulic radius of the cross section is to control the depth of water (debris-flow depth). At present, the main method utilized to control the water depth (debris-flow depth) is electric tailgate control. In addition, Xu Ming et al. proposed a no-tailgate test flume (CN200910062236.7) for hydraulics and sediment dynamics testing, which directly affects the water depth of the flume test section by changing the total water volume. However, these methods to control the hydraulic radius by adjusting the water depth (debris-flow depth) are not suitable for flume tests of hyperconcentrated flow and debris flow because the tailgate will deposit solid materials and change the properties of the fluid. It is also very difficult to control the water depth (debris-flow depth) of the flume test section through the total water volume because the hyperconcentrated flow and debris flow are not homogeneous fluids. Therefore, the fluctuation of the water depth (debris-flow depth) is inevitable during the test process. In addition, the existing calculation methods of the hydraulic radius depend on water depth (debris-flow depth), and the measurement accuracy of water depth (debris-flow depth) has a significant influence on the accuracy of the hydraulic radius. Especially in the discharging process of hyperconcentration flow and debris flow tests, the fluid depth is difficult to accurately measure, which has a great impact on the calculation accuracy of the hydraulic radius.

SUMMARY OF THE INVENTION

This invention provides a method for designing a test flume with a special-shaped cross section that has a fixed hydraulic radius from the perspective of optimizing the test section in view of the deficiencies of the prior art. In the test flume with a special-shaped cross section, when the water depth (debris-flow depth) is greater than a certain value, the hydraulic radius of the flow section remains constant as the water depth (debris-flow depth) increases, which can eliminate the influence of the water depth (debris-flow depth) on the hydraulic radius of the test section. The test flume designed by this method can guarantee that the hydraulic radius of each flow section is equal and constant when the water depth (debris-flow depth) is greater than a certain value.

To achieve this purpose, the technical scheme of the invention is as follows:

The invention provides a design method for a test flume with a special-shaped cross section, and the test flume with a special-shaped cross section is shown in FIG. 2-4. This test flume includes a foundation flume composed of a flume bottom and flume walls and an expansion flume located above the foundation flume (the expansion flume has only flume walls but no flume bottom). The lower edge of the expansion flume is connected to the upper edge of the foundation flume wall, and the cross-sectional shape of the foundation flume is rectangular, semicircular or triangular (correspondingly, the special-shaped section is divided into flat bottom special-shaped section, round bottom special-shaped section and sharp bottom shaped section). The cross section of the expansion flume has two axisymmetric curves.

The derivation process of the wall curve equation of the expansion flume is as follows:

The rectangular coordinate system where the expansion flume cross section curve is located is shown in FIG. 2 and is represented by $y=f(x)$. In the first quadrant, the cross-sectional curve can also be expressed as $x=g(y)$, $x \geq 0$. $f$ and $g$ are inverse functions of each other. When the water depth (debris-flow depth) is h ($h \geq d$), the hydraulic radius of the flow section is a constant value R:

$$R = \frac{A}{\chi} = \frac{2\int_0^{h-d} g(y)dy + S_{bot}}{2\int_0^{h-d} \sqrt{1+g'^2(y)}\,dy + l_{bot}} \tag{1}$$

where

A is the discharge area, (unit m$^2$), $\chi$ is the wet perimeter, (unit m), h is the water depth (debris-flow depth), (unit m), d is the depth of the foundation flume, (unit m), $S_{bot}$ is the area of the flow section of the foundation flume, (unit m$^2$), $l_{bot}$ is the wet perimeter of the flow section of the lower channel, (unit m), and g'(y) is the derivative function of g(x).

By simplifying Formula 1, we can obtain the following results:

$$2\int_0^{h-d} g(y)dy + S_{bot} = 2\int_0^{h-d} R \cdot \sqrt{1+g'^2(y)}\,dy + Rl_{bot} \tag{2}$$

When the water depth (debris-flow depth) is equal to the depth of the foundation flume (i.e., h=d), the hydraulic radius of the flow section is R, so $S_{bot} = Rl_{bot}$. To solve the integral equation of Formula 2, the following is obtained:

$$g(y) = R \cdot \cosh\left(\frac{y}{R} + C\right) \tag{3}$$

where C is the undetermined coefficient. The other parameters are the same as before.

In the first quadrant, since functions $f$ and $g$ are inverse functions of each other, function $f$ can be written as follows:

$$y = f(x) = R \cdot \left[ \text{arcosh}\left(\frac{x}{R}\right) - C \right], x \geq R \qquad (4)$$

Thus, the equation of the expansion flume cross section curve is obtained:

$$\begin{cases} y = R \cdot \left[ \text{arcosh}\left(\frac{-x}{R}\right) - C \right], x \leq -b/2 \\ y = R \cdot \left[ \text{arcosh}\left(\frac{x}{R}\right) - C \right], x \geq b/2 \end{cases}, y \geq 0 \qquad (5)$$

Within the range of the width B of the flume, Formula 5 can be expressed as follows:

$$\begin{cases} y = R \cdot \left[ \text{arcosh}\left(\frac{-x}{R}\right) - C \right], -B/2 \leq x \leq -b/2 \\ y = R \cdot \left[ \text{arcosh}\left(\frac{x}{R}\right) - C \right], b/2 \leq x \geq B/2 \end{cases} \qquad (6)$$

where
R is the design hydraulic radius of the flume, (unit m),
C is the undetermined coefficient,
b is the width of the foundation flume, (unit m), and
B is the width of the flume, (unit m).

The design method of the test flume with the special-shaped cross section is as follows:

Step 1: Determine the design hydraulic radius R (m) of the test flume; select the width of the foundation flume b (m), and determine the width of the foundation flume. The design hydraulic radius R (m) satisfies b>2R;

When 2R<b<4R, the cross section of the foundation flume is rectangular, and then R and b are substituted into formula $$d = \frac{Rb}{b - 2R}.$$

The depth d, unit m, is calculated.

When b=4R, the cross section of the foundation flume is semicircular, and then b is substituted into the formula d=b/2, where the depth d, unit m, is calculated.

When b>4R, the cross section of the foundation flume is triangular, and then R and b are substituted into the formula $$d = \frac{2Rb}{\sqrt{b^2 - 16R^2}};$$

the depth d, unit m, is calculated.

Step 2: The design hydraulic radius R and foundation flume width b obtained in step 1 are substituted into the formula $$C = \text{arcosh}\left(\frac{b}{2R}\right).$$

The undetermined coefficient C is calculated.

Step 3: Replace the width b of the foundation flume obtained in step 1 into the formula B=k·b. The width of the flume B, unit m, is calculated, where k is the coefficient and the value is 3-5.

Step 4: The cross section curve equation of the expansion flume is obtained by the following formula:

$$\begin{cases} y = R \cdot \left[ \text{arcosh}\left(\frac{-x}{R}\right) - C \right], -B/2 \leq x \leq -b/2 \\ y = R \cdot \left[ \text{arcosh}\left(\frac{x}{R}\right) - C \right], b/2 \leq x \leq B/2 \end{cases}$$

where
R is the design hydraulic radius of the test flume, unit m, determined by step 1;
C is the undetermined coefficient, determined by step 2;
B is the width of the flume, unit m, determined by step 3; and
b is the width of the foundation flume, unit m, determined by step 1.

The design method for the test flume with a special-shaped cross section can be used to design a flume by modeling the clear water flow, hyperconcentration flow and debris flow and can be used to design a flume with a test slope of 5%-30%. According to the foundation flume width b, depth d, flume width B and expansion flume wall curve equation obtained in steps 1, 3 and 4, the test flume with a special-shaped cross section is made. This type of flume is lapped with other components, as shown in FIG. 1. The specific structure is as follows: the special cross section test flume is connected to the hopper through the inlet valve of the flume upward and connected to the tailing pool downward. The flume is supported by the flume support, and the slope of the flume can be adjusted through the water flume slope regulator. A speed measuring camera and a light emitting diode (LED) shadowless lamp are installed on the top of the flume.

According to the design method of this invention, we can design the test flume with experimental requirements. In this flume, when the water depth (debris-flow depth) is less than the depth of the foundation flume (i.e., h<d), the hydraulic radius R increases with increasing water depth (debris-flow depth); when the water depth (debris-flow depth) is equal to the depth of the foundation flume (i.e., h=d), the hydraulic radius R of the test section is equal to $R_0$. When the water depth (debris-flow depth) h is further increased, the increasing area of the flow section ΔS is always $R_0$ times the increasing wet circumference Δl, so that the hydraulic radius R of the flow section of the test fluid remains unchanged. In other words, when the test water depth (debris-flow depth) is greater than or equal to the depth of the foundation flume (i.e., h≥d), the hydraulic radius R of the flow section of the test fluid remains constant at $R_0$, which does not change with increasing water depth (debris-flow depth) or the position of the cross section.

Compared with existing technologies, the beneficial effects of the present proposed design method of a test flume with a special cross section are as follows: the cross section of the test flume is designed as a special-shaped cross section. When the fluid depth is greater than or equal to the depth of the foundation flume, the hydraulic radius remains constant with the continuously increasing fluid depth, which solves the problem that the hydraulic radius of the cross section is difficult to control in model tests. This invention provides a feasible method for investigating the relationship between the average velocity and other kinematic parameters of clear water flow, hyperconcentration flow, and debris flow.

Figure 1:
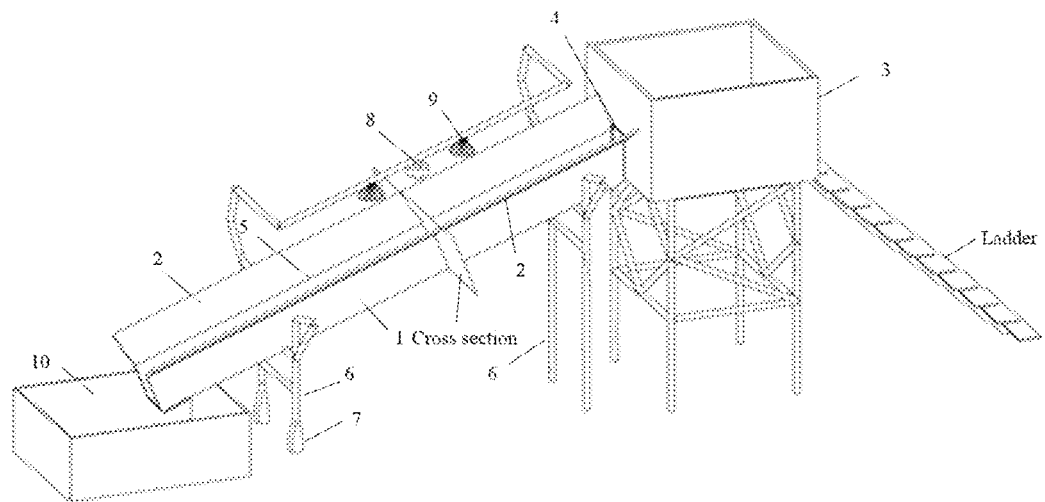
FIG. 1 is a structural diagram of a test flume with a special cross section.

1 Foundation flume
2 Expansion flume
3 Hopper
4 Flume inlet gate
5 Special section test flume
6 Flume support
7 Flume slope regulator
8 Speed camera
9 LED shadowless lamp
10 Tailing pool
b Width of the foundation flume
d Depth of the foundation flume
B Width of the flume
h Water depth (debris-flow depth)

DESCRIPTION OF THE EMBODIMENT

The embodiment of the invented design method of a test flume with a special-shaped cross section is shown in FIG. 1, FIG. 2, FIG. 3 and FIG. 4. To explore the relationship between the average velocity of the debris flow section and the hydraulic radius of the flow section, the design method of the special section test flume proposed in the invention is used to make three special section test flumes (5) and then build three test flume devices.

In the test flume device, the special cross section test flume (5) includes a foundation flume (1) and an expansion flume (2) above the foundation flume (1); the lower edge of the expansion flume (2) is connected to the upper edge of the flume wall of the foundation flume (1); the cross-sectional shape of the foundation flume (1) is rectangular, or semicircular or triangular, and the flume wall of the expansion flume (2) is two axisymmetric curves. The design method and steps of the special section test flume (5) are as follows:

In the first step, according to the experimental design, the design hydraulic radius R of three special section test flumes (5) is determined to be 0.05 m, 0.1 m and 0.15 m; according to the test site, the width b of three foundation flumes (1) is selected as 0.25 m, 0.4 m and 0.45 m; and the length of three special section test flumes (5) is 20 m.

Figure 4:
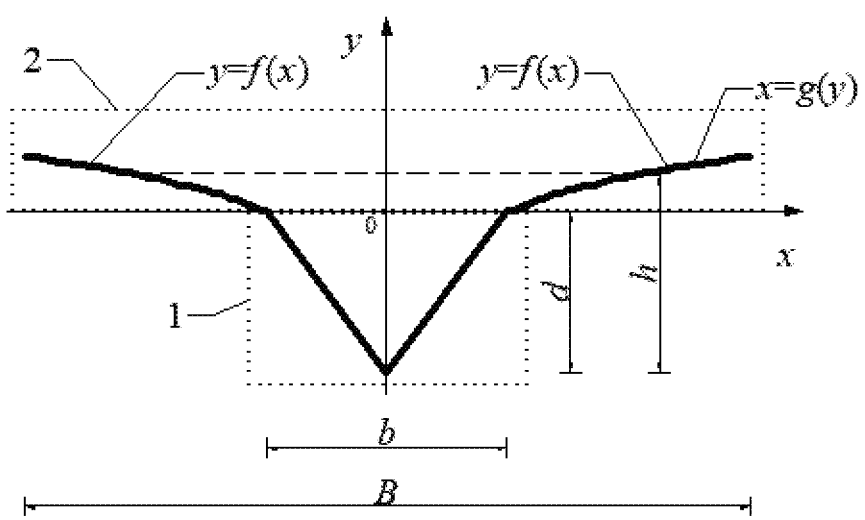
FIG. 4 is a cross section diagram of a test flume with a sharp bottom.

For the first special section test flume (5), because b=0.25 m, R=0.05 m, and b>4R, the cross-sectional shape of the foundation flume (1) is triangular (as shown in FIG. 4). Then, R and b are substituted into formula $$d = \frac{2Rb}{\sqrt{b^2 - 16R^2}},$$

and the depth d of the foundation flume (1) is calculated to be 0.167 m.

Figure 3:
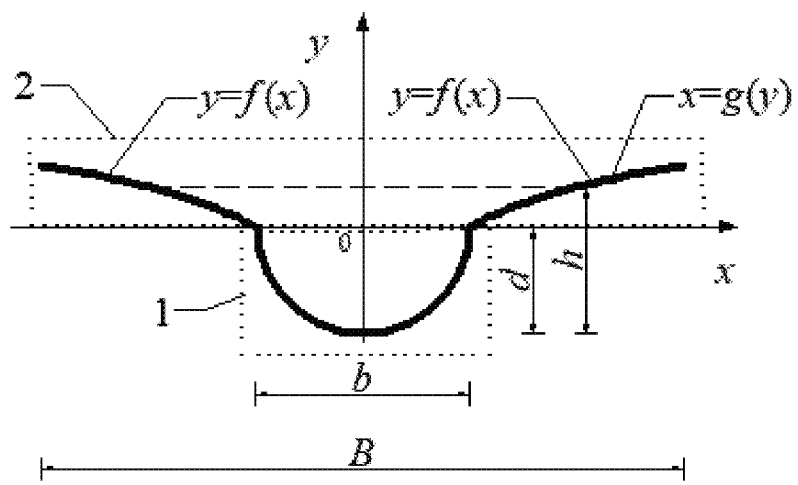
FIG. 3 is a cross section of a test flume with a round bottom.

For the second special cross section test flume (5), because b=0.4 m, R=0.1 m, and b=4R, the cross-sectional shape of the foundation flume (1) is semicircular (as shown in FIG. 3), and then substituting b into formula d=b/2, the depth d of the foundation flume (1) is calculated to be 0.2 m.

Figure 2:
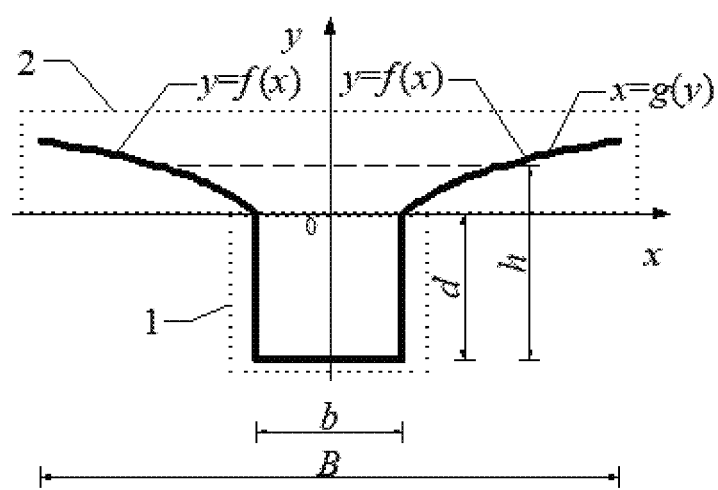
FIG. 2 is a cross section of a test flume with a flat bottom.

For the third special section test flume (5), since b=0.45 m, R=0.15 m, and 2R<b<4R, the cross-sectional shape of the foundation flume (1) is rectangular (as shown in FIG. 2). Then, R and b are substituted into formula $$d = \frac{Rb}{b - 2R},$$

and the depth d of the foundation flume (1) is calculated to be 0.45 m.

In the second step, the design hydraulic radius R and the width b of the foundation flume (1) obtained in the first step are substituted into formula $$C = arcosh\left(\frac{b}{2R}\right),$$

and the three undetermined coefficients C are arc osh (2.5), arc osh (2) and arc osh (1.5).

In the third step, for the first special section test flume (5), the coefficient k is selected as 5 according to the test site conditions, the width b of the foundation flume (1) obtained in the first step is substituted into formula B=k·b, and the width B of the flume is calculated to be 1.25 m. For the second special section test flume (5), the coefficient k is selected as 4 according to the test site conditions. The width b of the foundation flume (1) obtained in the first step is substituted into formula B=k·b, and the width B of the flume is calculated to be 1.6 m. For the third special section test flume (5), the coefficient k is selected as 3 according to the test site conditions. The width b of the foundation flume (1) obtained in the first step is substituted into formula B=k·b, and the width B of the flume is calculated to be 1.35 m.

In the fourth step, the design hydraulic radius R of the three special section test flumes (5), the width b of the three foundation flumes (1) determined in the first step, the three undetermined coefficients C determined in the second step, and the three flume widths B determined in the third step are substituted into the following formula:

$$\begin{cases} y = R \cdot \left[arcosh\left(\frac{-x}{R}\right) - C\right], -B/2 \le x \le -b/2 \\ y = R \cdot \left[arcosh\left(\frac{x}{R}\right) - C\right], b/2 \le x \le B/2 \end{cases}$$

The cross section curve equations of three expansion flumes (2) are obtained:

The first special section test flume (5) is as follows:

$$\begin{cases} y = 0.05 \times [arcosh(-20x) - arcosh(2.5)], -0.625 \le x \le -0.125 \\ y = 0.05 \times [arcosh(20x) - arcosh(2.5)], 0.125 \le x \le 0.625 \end{cases}$$

The second special section test flume (5) is as follows:

$$\begin{cases} y = 0.1 \times [arcosh(-10x) - arcosh(2)], -0.8 \le x \le -0.2 \\ y = 0.1 \times [arcosh(10x) - arcosh(2)], 0.2 \le x \le 0.8 \end{cases}$$

The third special section test flume (5) is as follows:

$$\left\{\begin{array}{l} y = 0.15 \times \left[arcosh\left(\dfrac{-20x}{3}\right) - arcosh(1.5)\right], -0.675 \le x \le -0.225 \\ y = 0.15 \times \left[arcosh\left(\dfrac{20x}{3}\right) - arcosh(1.5)\right], 0.225 \le x \le 0.675 \end{array}\right\}$$

According to the width b, depth d of the foundation flume (1), width B of the flume and cross-sectional curve of the expansion flume obtained in the first, third and fourth steps, three special section test flumes (5) are made. As shown in FIG. 1, the special section test flume (5) overlaps with the hopper (3), flume inlet gate (4), flume support (6), flume slope regulator (7), speed camera (8), LED shadowless lamp (9) and tailing pool (10) as three special cross section test flume devices with a constant hydraulic radius.

The test fluid enters the special cross section test flume (5) from the hopper (3) through the flume inlet gate (4). The special cross section test flume (5) is supported by the flume support (6), and the flume slope regulator (7) is installed at the lower end of flume support (6), which is used to adjust the change in the flume slope in the range of 5%-30%. After the test fluid enters the special section test flume (5), with the cooperation of the LED shadowless lamp (9), the speed camera (8) records the speed of the test fluid. The test fluid passes through the whole special cross section test flume (5) and enters the tailings pool (10) through the outlet of the flume.

We claim:

1. A method for forming a test flume usable in hydraulic engineering and debris-flow hazard mitigation,
   wherein the test flume comprises: a foundation flume having a bottom wall and at least two side walls, and an expansion flume above the foundation flume;
   wherein the expansion flume has a lower edge connected to an upper edge of the foundation flume;
   wherein the foundation flume has a cross section that is rectangular, semicircular or triangular, and the expansion flume has a cross section that comprises two axisymmetric curves,
   the method comprising:
   determining a hydraulic radius R of the test flume based on a model test;
   selecting a width b of the foundation flume based on a size of the test site of the model test, wherein the width b and the hydraulic radius R satisfies b>2R;
   wherein when it is determined that 2R<b<4R, selecting the cross section of the foundation flume to be rectangular, and calculating a depth d by using formula $$d = \dfrac{Rb}{b - 2R};$$

wherein when it is determined that b=4R, selecting the cross section of the foundation flume to be semicircular, and calculating the depth d by using formula d=b/2;
   wherein when it is determined that b>4R, selecting the cross section of the foundation flume to be triangular, and calculating the depth d by using formula $$d = \dfrac{2Rb}{\sqrt{b^2 - 16R^2}};$$

obtaining a coefficient C by using formula $$C = arcosh\left(\dfrac{b}{2R}\right);$$

obtaining a width B of the test flume by using formula B=k·b, wherein k is a coefficient;
   obtaining a cross section curve equation of the expansion flume by using formula:

$$\left\{\begin{array}{l} y = R \cdot \left[arcosh\left(\dfrac{-x}{R}\right) - C\right], -B/2 \le x \le -b/2 \\ y = R \cdot \left[arcosh\left(\dfrac{x}{R}\right) - C\right], b/2 \le x \le B/2 \end{array}\right\}$$

where R is the hydraulic radius of the test flume, C is the coefficient, B is the width of the test flume and b is the width of the foundation flume; and
   forming the test flume based on the cross section curve equation of the expansion flume.

2. A method of using the method of claim 1, wherein the test flume is used with a simulated test fluid of clear water flow, hyperconcentration flow or debris flow.

3. A method of using the method of claim 1, wherein the test flume is used to design a flume with a test slope of 5%-30%.

* * * * *